US011226687B2

(12) United States Patent
Lopez Gil et al.

(10) Patent No.: US 11,226,687 B2
(45) Date of Patent: Jan. 18, 2022

(54) SYSTEM AND METHOD FOR PREVENTING SIGHT DETERIORATION CAUSED BY NEAR WORK WITH DEVICES WITH ELECTRONIC SCREENS

(71) Applicant: VISIONAPP SOLUTIONS S.L., Murcia (ES)

(72) Inventors: Norberto Lopez Gil, Murcia (ES); Yuou Liu, Murcia (ES)

(73) Assignee: VISIONAPP SOLUTIONS S.L., Murcia (ES)

( * ) Notice: Subject to any disclaimer, the term of this patent is extended or adjusted under 35 U.S.C. 154(b) by 0 days.

(21) Appl. No.: 16/317,668

(22) PCT Filed: Jul. 21, 2016

(86) PCT No.: PCT/EP2016/067425
§ 371 (c)(1),
(2) Date: Jan. 14, 2019

(87) PCT Pub. No.: WO2018/014960
PCT Pub. Date: Jan. 25, 2018

(65) Prior Publication Data
US 2019/0227636 A1 Jul. 25, 2019

(51) Int. Cl.
*G06K 9/00* (2006.01)
*G06F 3/01* (2006.01)
(Continued)

(52) U.S. Cl.
CPC .............. *G06F 3/017* (2013.01); *G06F 3/012* (2013.01); *G06F 3/013* (2013.01); *G06F 3/147* (2013.01);
(Continued)

(58) Field of Classification Search
None
See application file for complete search history.

(56) References Cited

U.S. PATENT DOCUMENTS 7,315,334 B2 * 1/2008 Donato .................... H04N 5/44 348/819
9,508,005 B2 * 11/2016 Peng ......................... G06T 7/73
(Continued)

FOREIGN PATENT DOCUMENTS

CN 104850320 A 8/2015
EP 2816545 A2 12/2014

OTHER PUBLICATIONS

International Search Report and Written Opinion dated Feb. 22, 2017 for corresponding International Application No. PCT/EP2016/067425.

*Primary Examiner* — Soo Jin Park
(74) *Attorney, Agent, or Firm* — Lucas & Mercanti, LLP

(57) ABSTRACT

Systems and methods for preventing sight deterioration caused by near work with devices with electronic screens arc provided. A system can include, in addition to an electronic screen, a distance detector directed towards a user. A system can also include processing circuitry coupled to a distance detector. Processing circuitry determines the distance between a user's head and a screen, relative to a calibration distance, and in case it is shorter than the calibration distance (putting the user at risk of future sight deterioration and progression of myopia), it can send a control signal to circuitry operative to notify the user. If processing circuitry determines that said distance is equal or longer than the calibration distance, the circuitry operative can slop the notification. A notification can be modulated by stud relative distance, making a user instinctively move a device away.

13 Claims, 9 Drawing Sheets

600
610 USING A CAMERA TO CAPTURE IMAGES OF A USER'S HEAD
620 USING A PROCESSING CIRCUITRY TO DETECT THE USER'S HEAD IN THE IMAGE
630 IMAGE INCLUDES THE USER'S HEAD OR A PART OF IT ?
NO
YES
640 USING THE IMAGE PROCESSING CIRCUITRY TO DETERMINE A DISTANCE BETWEEN THE USER'S HEAD AND A DEVICE
650 DISTANCE IS SHORTER THAN A CALIBRATION DISTANCE ?
NO
YES
660 USING A CONTROL CIRCUITRY TO STOP NOTIFYING THE USER
670 USING A CONTROL CIRCUITRY TO NOTIFY THE USER
GOTO 610

(51) Int. Cl.

*G06F 3/147* (2006.01)
*G09G 5/00* (2006.01)
*G06T 7/70* (2017.01)

(52) U.S. Cl.

CPC ................. *G06T 7/70* (2017.01); *G09G 5/00* (2013.01); *G06K 9/00221* (2013.01); *G09G 2354/00* (2013.01)

(56) References Cited

U.S. PATENT DOCUMENTS 9,594,945 B2* 3/2017 Park ........................ G06F 3/012
2004/0239517 A1* 12/2004 Coley .................. G08B 21/182 340/686.6
2009/0097716 A1 4/2009 Wang et al.
2009/0141147 A1* 6/2009 Alberts ................... G06F 3/012 348/240.99
2011/0249136 A1* 10/2011 Levy ...................... H04N 5/222 348/222.1
2012/0105585 A1 5/2012 Masalkar et al.
2012/0127325 A1* 5/2012 Lai .......................... G06F 3/011 348/207.1
2013/0286164 A1* 10/2013 Kim ........................ G06T 7/593 348/48
2015/0201236 A1* 7/2015 Al Remeithi ...... H04N 21/4882 348/77
2015/0213702 A1* 7/2015 Kimmel .................... G06T 7/20 382/103
2015/0379716 A1* 12/2015 Peng ...................... G08B 21/02 382/106
2016/0011655 A1 1/2016 Ji et al.
2016/0026241 A1* 1/2016 Leung ............... H04M 1/72569 345/156
2016/0337598 A1* 11/2016 Zaitsev .................. H04N 5/247
2017/0068314 A1* 3/2017 Fu ......................... G06F 3/0304
2017/0345393 A1* 11/2017 Wu ...................... G06K 9/0061

* cited by examiner

SYSTEM AND METHOD FOR PREVENTING SIGHT DETERIORATION CAUSED BY NEAR WORK WITH DEVICES WITH ELECTRONIC SCREENS

CROSS REFERENCE TO RELATED APPLICATION

This Application is a 371 of PCT/EP2016/067425 filed on Jul. 21, 2016, which is incorporated herein by reference.

FIELD OF THE INVENTION

This is related to the fields of visual optics, physiological optics, electronics and computers. In particular, this is related to systems and methods of preventing sight problems, such as myopia, that are due to the prolonged use of electronic screens at short distances.

BACKGROUND OF THE INVENTION

The prolonged use of portable devices, especially those with small screens, can cause ocular conditions such as eye fatigue, blurred vision, headaches, muscle strain and dry eye. It may also be one of the causes of myopia progression in the long term.

Myopia (or short-sightedness) is associated with the progressive and excessive elongation of the ocular globe, which may be accompanied by degenerative changes in the sclera, choroid, retinal pigment epithelium and neural retina. It is a significant public health problem worldwide, and a leading cause of blindness with a rapid increase in prevalence in recent decades.

Near work over extended periods of time is believed to induce eyeball elongation as the eye continues to accommodate to stimuli at close distances and is a cause of myopia progression.

Several therapeutic methods have been developed to control myopia progression and stop the axial elongation of the eye; pharmacological drugs paralyzing accommodation, corneal reshaping, multi-focal contact lenses, and others.

Although several solutions for preventing myopia progression, based on using electronic devices equipped with electronic screens and distance sensors (e.g, cameras) have been proposed, none of them include a calibration procedure that would allow using a distance between an electronic screen and a user's head relative to a calibration distance without knowing distance sensor parameters (e.g., focal length of a camera). Known solutions also lack including a possibility of modulating a warning signal by said distance, allowing a user to instinctively move a device away, beyond said calibration distance. Thus, as of today, a practical solution to prevent sight deterioration and progression of myopia, applicable to electronic devices equipped with electronic screens and distance sensors has not been proposed or implemented. Furthermore, capabilities of electronic devices already on the market are not being taken advantage of fully to prevent sight deterioration and progression of myopia.

EP2816545A2 discloses techniques for controlling a display in order to secure an appropriate viewing distance between a digital device and a user who is viewing the digital device. In particular, it proposes a hazardous distance that is determined based on a default value proportional to the screen size and uses pupils instead of the head.

US2009097716A1 discloses techniques capable of obtaining and outputting a distance between a human face and the camera device, so as to prevent the user from getting too close to the screen. It obtains a distance information between the human face corresponding to the human face image data and the camera device according to the human face image data.

US2016011655A1 discloses control techniques for a user to play electronic products at a suitable distance and prevent myopia. A distance sensor, a display screen, a controller and a fuzzy processing device are used. Based on the distance between the user and the display screen and the controller uses fuzzy processing and may diffuse the light emitted from the display screen uniformly.

US2012105585A1 relates to cameras and software gesture recognition to provide a natural user interface using a depth sensor to control game characters or other aspects of an application. It discloses techniques for recalibrating the depth sensor in order to correct for any measurement error after factory calibration.

SUMMARY OF THE INVENTION

The present invention is directed to systems and methods for preventing sight deterioration caused by near work with devices with electronic screens. A system can include, in addition to an electronic screen, a distance sensor directed towards a user. A system can also include processing circuitry coupled to a distance sensor and control circuitry coupled to an electronic screen. If a processing circuitry determines that a distance between a user's head and a device is shorter than a calibration distance, it can send a control signal to control circuitry to notify a user. If a processing circuitry determines that said distance is equal or longer than a calibration distance, a control circuitry can stop notifications or not initiate them.

In some embodiments, a device can modify an operation of an electronic screen, based on a relation between actual distance between a user's head and a device, determined by processing circuitry, relative to a calibration distance. For example, a user can be using a device at a close distance that may put the user at risk of sight deterioration. Processing circuitry coupled to a distance sensor of a device can then determine said relative distance using the calibration distance, and notify a user by, for example: blurring, darkening or changing a color of an electronic screen, which can make a user instinctively move a device away. As another example, a device can notify a user by displaying information on a screen, emitting a sound from a speaker, vibrating a device or a combination of any of the above.

BRIEF DESCRIPTION OF THE DRAWINGS

The following figures accompanying the detailed description below serve to further illustrate the nature of the present invention and its advantages.

DETAILED DESCRIPTION

This is directed to systems and methods for preventing sight deterioration caused by near work with devices with electronic screens. An electronic device can determine a distance between a user and an electronic screen using a distance sensor directed towards a user and notify the user if the distance is shorter than a calibration distance, putting the user at risk of sight deterioration and progression of myopia. For example, an electronic device can include a camera coupled to a processing circuitry for passive detection of a user's head. Image processing circuitry can analyze images from a camera (e.g., single pictures or video frames) and determine if they contain an image of at least a part of a user's head (hereinafter referred to as "user's head"). Accordingly, images that contain an image of a user's head can be analyzed to determine a distance between a user's head and a device. If a processing circuitry determines that a distance between a user's head and a device is shorter than a calibration distance, it can send a control signal to control circuitry to notify a user, for example by showing an information on a screen, emitting a sound from a speaker, or vibrating a device. On the other hand, if a processing circuitry determines that a distance between a user's head and a device is equal or longer than a calibration distance, the control circuitry can stop notifications or not initiate them.

Control circuitry can also modify operation of a device or one or more components of a device, for example by blurring, darkening or changing a color of an electronic screen, with the finality of making a user instinctively move a device away. Furthermore, strength of this modification can be modulated by a ratio between a distance between a user's head and a device relative to a calibration distance. For example, a screen can be made progressively more blurred, or darker as said ratio becomes smaller.

Figure 1:
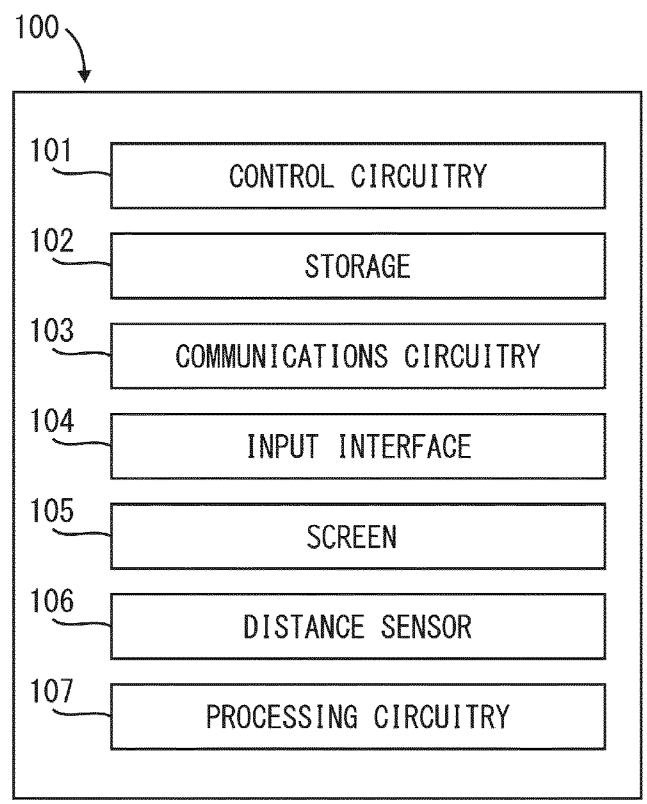
FIG. 1 is a block diagram of an illustrative electronic device for preventing sight deterioration caused by near work with devices with electronic screens in accordance with one embodiment of the invention.

FIG. 1 is a schematic overview of an illustrative electronic device for preventing sight deterioration caused by near work with devices with electronic screens in accordance with one embodiment of the invention. Electronic device 100 can include control circuitry 101, storage 102, communications circuitry 103, input interface 104, screen 105, distance sensor 106 and processing circuitry 107. In some embodiments, one or more of device's components can be combined or omitted. For example, a distance sensor 106 can include two cameras combined into a single mechanism for stereoscopic distance determination. In some embodiments, electronic device 100 can include other components not included in FIG. 1, such as: a vibration component; a speaker; a microphone; an accelerometer; a gyroscope; or a combination of any of the aforementioned components.

Electronic device 100 can include any suitable type of device with an electronic screen and a capability to determine a distance between a user's head and a device. For example, electronic device 100 can include any of the following devices equipped with a camera: a mobile phone, a tablet, a "smart" television set, a personal digital assistant (PDA), a laptop or desktop computer, a stand-alone camera or video-recorder, and any other suitable device.

Control circuitry 101 can include any circuitry and processors designed to control the functions, operations and performance of an electronic device 100. Storage 102 can include one or more storage mediums, such as internal or external memory of any type, such as: HDD, SSD, RAM, ROM, flash memory such as an SD (i.e. Secure Digital) card of CF (i.e. Compact Flash) card, or any other type of memory suitable for device 100. Communications circuitry 103 can include any circuitry suitable to connect a device to a communications network and transmit communications using any suitable protocol such as, for example, Wi-Fi (e.g., a 802.11 protocol), Bluetooth®, cellular protocol (e.g., GSM, GPRS, CDMA, EDGE, LTE), or any other communications protocol or any combination thereof. Input interface 104 can include any suitable mechanism for receiving inputs from a user.

Screen 105 can include any suitable mechanism for displaying information to a user. In some embodiments, screen 105 can include a screen control circuitry 101 for controlling the level of illumination. Furthermore, screen 105 can be electronically coupled with control circuitry 101 and other components within an electronic device 100, or any combination thereof.

Distance sensor 106 can include any suitable device for determining a distance between a user's head and a device. In some embodiments, distance sensor 106 can include one or more cameras coupled to processing circuitry 107 for processing output images of a camera (e.g., single pictures or video frames) and passive determination of a distance between a user's head and a device. In some embodiments, distance sensor 106 can include a signal emitter and a sensor for active determination of a distance between a user's head and a device. For example, distance sensor 106 can include an emitter of infrared light and an optoelectronic sensor of infrared light coupled to processing circuitry 107 for signal processing and distance determination. As another example, distance sensor 106 can include an ultrasound emitter and an ultrasound-sensitive microphone coupled to processing circuitry 107 for signal processing and distance determination. Furthermore, in some embodiments, distance sensor 106 can include a combination of both active and passive components for determination of distance between a user's head and a device.

As previously described, an electronic device can determine a distance between a user and an electronic screen using a distance sensor directed towards a user and notify the user if the distance is shorter than a calibration distance. The combination of a device capable of determining a distance between the device and a user, that furthermore can notify a user when said distance is closer than a calibration distance, can form a system for preventing sight deterioration.

Figure 2A:
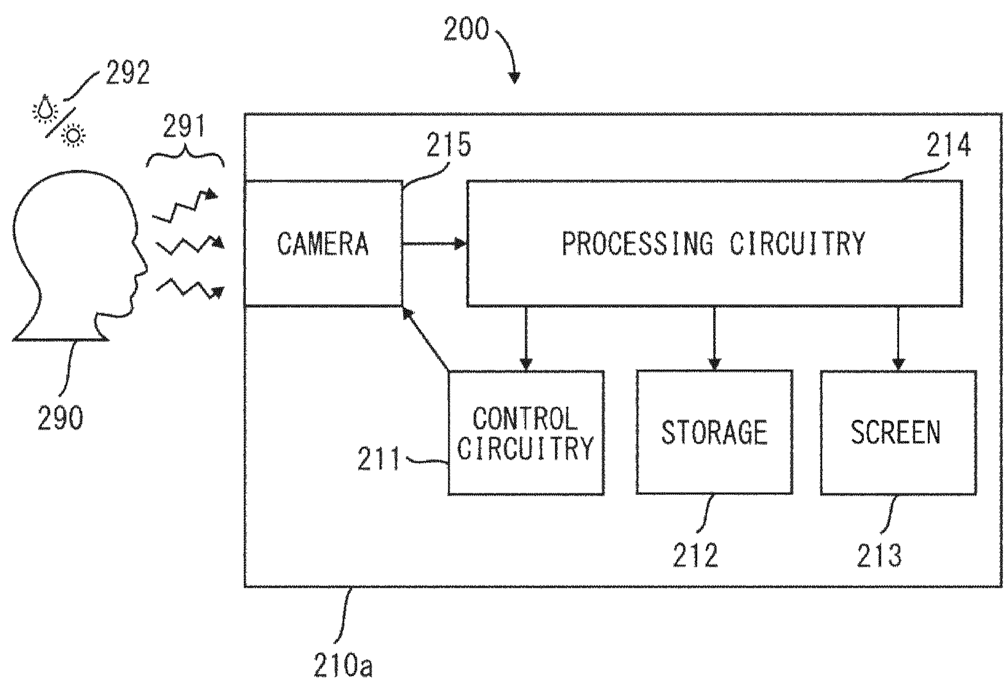
FIG. 2*a* is a schematic of an illustrative system for preventing sight deterioration in accordance with one embodiment of the invention where a camera is used as a distance sensor.

FIG. 2*a* is a schematic view of system 200 for preventing sight deterioration in accordance with one embodiment of the invention where a camera is used as a distance sensor. System 200 can include an electronic device 210*a* that can include a camera 215 and processing circuitry 214 to detect a user's head 290 using ambient light 292 reflected diffusely 291 from a user's head 290. Electronic device 210 can be very similar to electronic device 100 shown in FIG. 1 and share descriptions of components of the latter. For example, electronic device 210 can include control circuitry 211, storage 212, screen 213, and processing circuitry 214 that can be substantially similar to respective components of electronic device 100; control circuitry 101, storage 102, screen 105 and processing circuitry 107. Electronic device 210 can also include other suitable components such as communications circuitry 103, and input interface 104 shown in FIG. 1.

Processing circuitry 214 can use any suitable technique or combination of techniques for processing output images (e.g., single pictures or video frames) of a camera 215, detecting if they contain an image of a user's head 290, and determining if a distance between a user's head 290 and a device is shorter than a calibration distance, putting a user at risk of sight deterioration and myopia progression. If an image of a user's head is detected, processing circuitry 214 can use any suitable technique or combination of techniques for determining a distance between a user's head 290 and a device. For example, processing circuitry 214 can determine a distance between a user's head 290 and a device relative to a similar distance obtained in a calibration procedure. More specifically, the processing circuitry can determine this relation based upon a number of pixels subtended by an image of the user's head, and a similar number of pixels obtained in the calibration procedure.

If a distance between a user's head 290 and a device, determined by processing circuitry 214 is shorter than a calibration distance (i.e., their ratio is lower than 1) it can send a control signal to control circuitry 211. Control circuitry 211 can then perform a function based on said control signal. For example, control circuitry 211 can instruct screen 213 to show information to a user or to modify its operation (e.g., darken, blur or change a color of the screen).

On the other hand, if a distance between a user's head 290 and a device, determined by processing circuitry 214 is equal or longer than a calibration distance (i.e., their ratio is lower than 1), or if an image of a head is not detected by processing circuitry 214, it can send a control signal to control circuitry 211, which in turn can instruct the screen 213 to cease a modification of its operation. In some embodiments, said modification of operation of screen 213 can be substituted by a modification of operation of another component of a device 200, such as: strength of a vibration component; volume of a sound emitted from a speaker; or any combination of any of the aforementioned modifications.

In some embodiments, the strength of this modification of operation of screen 213 can be modulated by control circuitry 211 in response to a control signal from processing circuitry 214. For example, a screen can be made progressively more blurred, or darker as said ratio becomes smaller.

In some embodiments, processing circuitry 214 can perform processing and analysis of consecutive frames (e.g., images in a video stream) in order to determine a distance between a user's head and a device continuously, at a frame rate determined by a camera 215. In some embodiments control circuitry 211 can modify the frame rate to improve performance. For example, the frame rate of processing and analysis performed by processing circuitry 214 can be modified by control circuitry 211 according to a user's input provided by an equivalent of input interface 104 in electronic device 210.

In some embodiments, processing circuitry 214 can, in order to accurately determine a distance between a user's head 290 and a device, take into account various parameters of camera 215, such as: physical dimensions of the camera's sensor; size of an image from the camera; focal length the camera's lens; other camera parameters; any combination of any of the above. Furthermore, to the same end, processing circuitry 214 can make use of additional capabilities of camera 215, such as auto-focus or exposure control or others, or any combination of any of the above. For example, any suitable processing circuitry 214 can determine insufficient exposure of an image of a user's head 290 and send a control signal to control circuitry 211 to increase exposure of a camera 215.

Figure 2B:
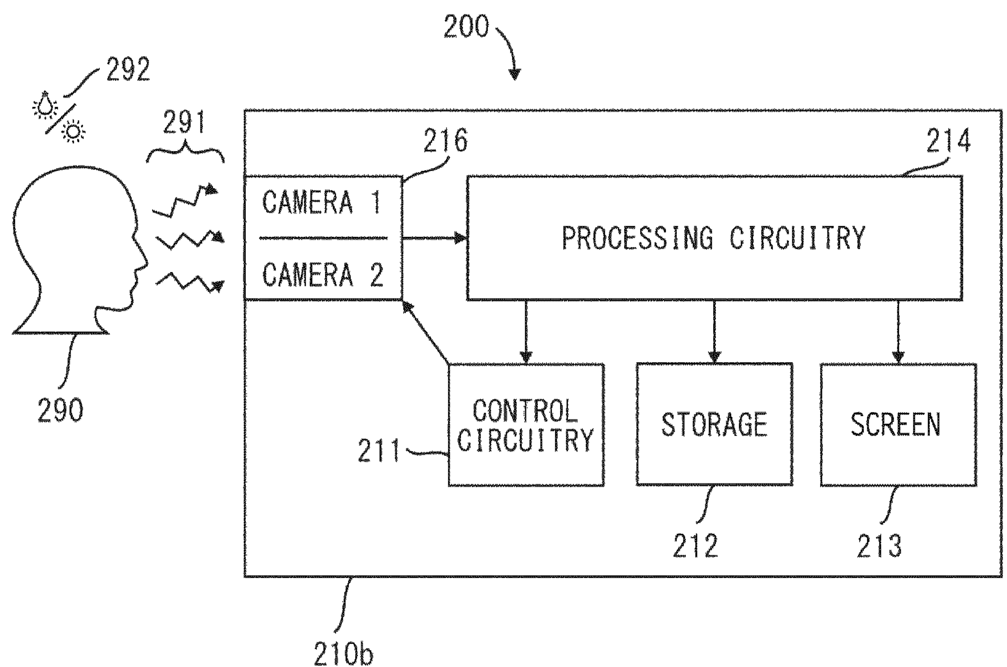
FIG. 2*b* is a schematic of an illustrative system for preventing sight deterioration in accordance with one embodiment of the invention where two cameras are used as a distance sensor.

In some embodiments, system 200 can include electronic device 210*b*, which can include two cameras combined into a single distance sensor 216 equivalent to a distance sensor 106 in electronic device 100 as presented in a schematic illustration of system 200 in FIG. 2*b*. In such case, processing circuitry 214 can determine a distance between a user's head 290 and a device stereoscopically, based on two images from two cameras, and additional parameters such as: physical displacement between cameras; physical angle between optical axes of cameras; focal lengths of cameras' lenses; physical dimensions of cameras' sensors; or others; or any combination of any of the above.

Figure 2C:
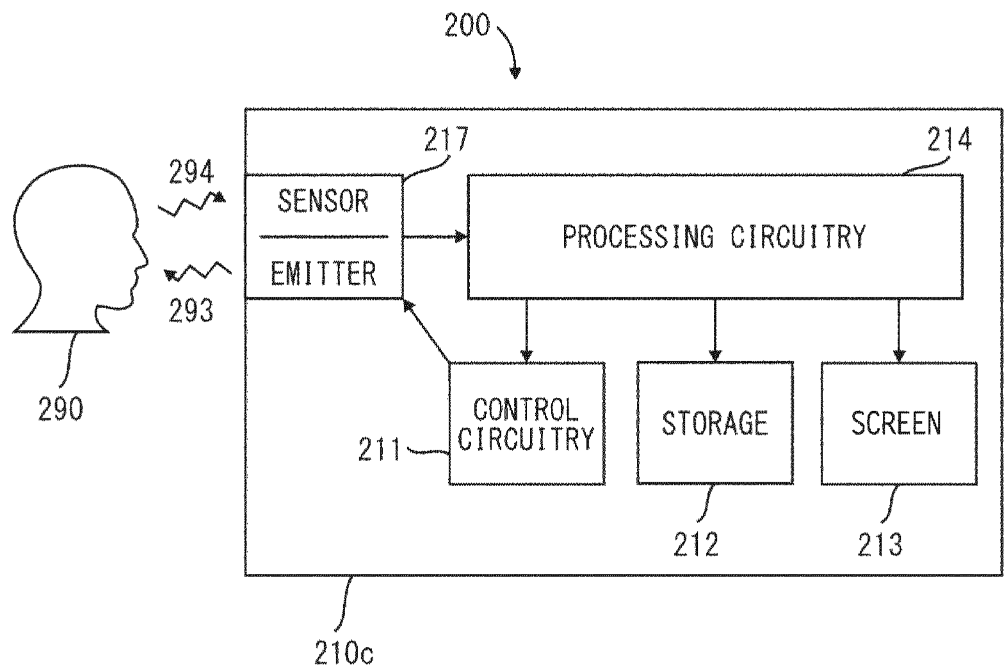
FIG. 2*c* is a schematic of an illustrative system for preventing sight deterioration in accordance with one embodiment of the invention where a detector coupled with a signal emitter is used as a distance sensor.

In some embodiments, system 200 can include electronic device 210*c*, which can include a sensor and an emitter combined into a single distance sensor 217 equivalent to a distance sensor 106 in electronic device 100 as presented in a schematic illustration of system 200 in FIG. 2*c*. A sensor component of distance sensor 217 can include one of the following sensors: an inductive sensor, a capacitive sensor, a photoelectric sensor, an optoelectronic sensor, a magnetic sensor, a sonic sensor, or any combination of any of the above. A corresponding emitter component of distance sensor 217 can include any suitable device capable of emitting a signal detectable by said sensor component. For example, said emitter component can include an ultrasound speaker coupled to control circuitry 211, and said sensor component can include a microphone sensitive to ultrasounds, coupled to a processing circuitry 214. In such case, processing circuitry 214 can determine a distance between a user's head 290 and a device based on a signal 293 emitted towards a user's head by an emitter component of distance sensor 217, reflected 294 from the head 290 and detected by a sensor component of distance sensor 217. Control circuitry 211 can send control signals to modify parameters of distance sensor 217, such as power of emitted signal or power of detected signal. For example, control circuitry 211 can send a control signal to an emitter component of distance sensor 217 to increase output of emitted signal, after receiving a control signal sent by processing circuitry 214, in response to insufficient power of a signal detected by a sensor component of distance sensor 217.

In some embodiments, a user can configure a system to prevent sight deterioration. A user can be able to configure parameters to control: detecting a user's head; determining a distance between a user and a device (e.g., sensitivity); modifying an operation of a device (e.g., effect type, strength); or notifying a user.

Figure 3:
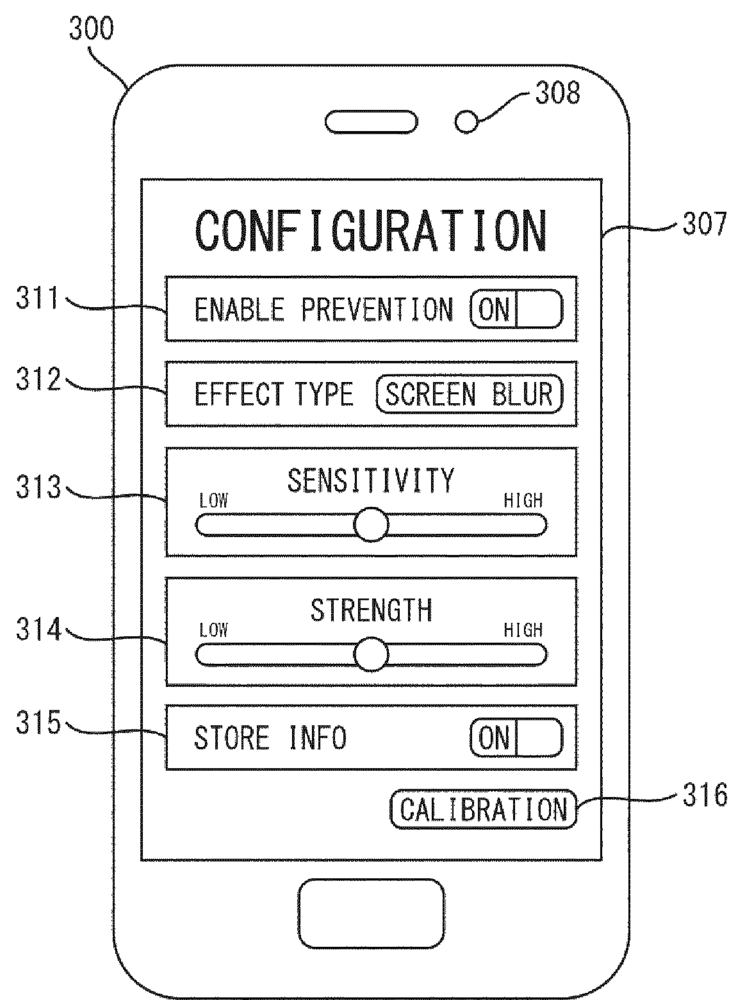
FIG. 3 is an example view of an illustrative screen for configuring an electronic device to prevent sight deterioration in accordance with one embodiment of the invention.

FIG. 3 is an example view of an illustrative screen for configuring an electronic device to prevent sight deterioration in accordance with one embodiment of the invention.

Device 300 can be an electronic device with a screen 307 and a camera 308 used as a distance sensor. Device 300 can be substantially similar to device 100 shown in FIG. 1 and device 210 shown in FIG. 2*a-c* and share descriptions of components with any or all of the latter. For example, device 300 can include a distance sensor including one or more cameras 308 for capturing images of a user's head (corresponding to distance sensor 106 in FIG. 1 and distance sensor 215 in FIG. 2*a*, and 216 in FIG. 2*b*). Device 300 can include a screen 307 (see, e.g., screen 105 in FIG. 1 and screen 213 in FIG. 2*a-c*) and any other suitable electronic device components or any combination thereof.

Configuration screen 307 can be shown on screen 307 and include parameters to control: detecting a user's head 290; determining a distance between a user's head 290 and a device 300; modifying an operation of a device; notifying a user. In some embodiments, a configuration screen 307 can include a setting 311 for enabling or disabling a prevention of sight deterioration generally. For example, a user can set setting 311 to "OFF", so that device 300 cannot perform functions of a system for preventing sight deterioration. In the embodiment in FIG. 3, setting 311 can be set to "ON" so that the device can determine a distance between the device and a user's head 290, and notify a user when the said distance is shorter than a calibration distance. In some embodiments, a configuration screen 307 can include a setting 312, corresponding to a modification of operation of a device. For example, a user can set setting 312 to "BLUR SCREEN", to specify the type of modification of operation of a device. More specifically, the value of setting 312 can instruct control circuitry in device 300 (see, e.g., control circuitry 101 shown in FIG. 1 and control circuitry 211 in FIG. 2*a*) to blur information displayed on a screen of a device. In another example, a user can set setting 312 to "DARKEN SCREEN", "WARNING SOUND", "VIBRATION" or "FLASHING INFO", to instruct control circuitry in device 300 to perform respectively: darkening information displayed on a screen of a device; emitting a sound from a speaker of a device; vibrating a vibrating component of a device; showing an information message to a user on a screen, or any combination of any of the above.

In some embodiments, configuration screen 307 can include a setting 313, corresponding to a sensitivity of determination of a distance between a user's head 290 and a device. For example, a user can set setting 313 on a sliding scale between "LOW" and "HIGH", to specify sensitivity. More specifically, the value of setting 313 can modify the sensitivity of processing circuitry in device 300 (see, e.g., processing circuitry 107 in FIG. 1 and processing circuitry 214 in FIG. 2*a-c*). If option 313 is set to "LOW" sensitivity, said processing circuitry of device 300 can notify a user only when said distance is much shorter than said calibration distance. On the other hand, if option 313 is set to "HIGH" sensitivity, said processing circuitry of device 300 can notify a user already when said distance is slightly shorter than said calibration distance. In some embodiments, configuration screen 307 can include a setting 314, corresponding to strength of a modification of operation of a device. For example, a user can set setting 314 on a sliding scale between "LOW" and "HIGH", to specify strength. More specifically, the value of setting 314 can modify the functioning of control circuitry in device 300 (see, e.g., control circuitry 101 shown in FIG. 1 and control circuitry 211 in FIG. 2*a-c*). If option 314 is set to "LOW" strength, an operation of device 300 can only be modified a small amount in accordance with effect type 312 (e.g. a information displayed on a screen of a device can be blurred by a small amount). On the other hand, if option 314 is set to a "HIGH" strength, an operation of device 300 can be modified a large amount in accordance with effect type 312 (e.g. a information displayed on a screen can be blurred beyond legibility).

In some embodiments, configuration screen 307 can include a setting 315 for enabling or disabling storage of information used by processing circuitry, control circuitry, distance sensor or other components of device 300. A user can set setting 315 to "OFF" so that device 300 will not store information. In the embodiment shown in FIG. 3, setting 315 is set to "ON" so that device 300 stores information. More specifically, setting 315 can correspond to an equivalent of storage 102 in FIG. 1 to store information in memory of device 300, or an equivalent of communications circuitry 103 in FIG. 1 of device 300 to store information using a network. It is understood that, in embodiments where processing circuitry performs processing and analysis of signals and data, certain information must be temporarily stored in memory of a device and a user cannot be able to set configuration settings to disable such storage.

In some embodiments, a user can calibrate a system to prevent sight deterioration. For example, a user can be able to calibrate a relation between a physical distance from a user's head 290 to a device and a number of pixels measured by the head in an image of a camera, which can be used by processing circuitry. In some embodiments, configuration screen 307 can include an option 316 to perform a calibration of device 300. For example, a user can initiate a calibration by selecting option 316. In some embodiments the user can skip performing a calibration procedure, in which case a default calibration is used by processing circuitry (see, e.g., processing circuitry 107 in FIG. 1, and processing circuitry 214 in FIG. 2*a-c*).

Figure 4:
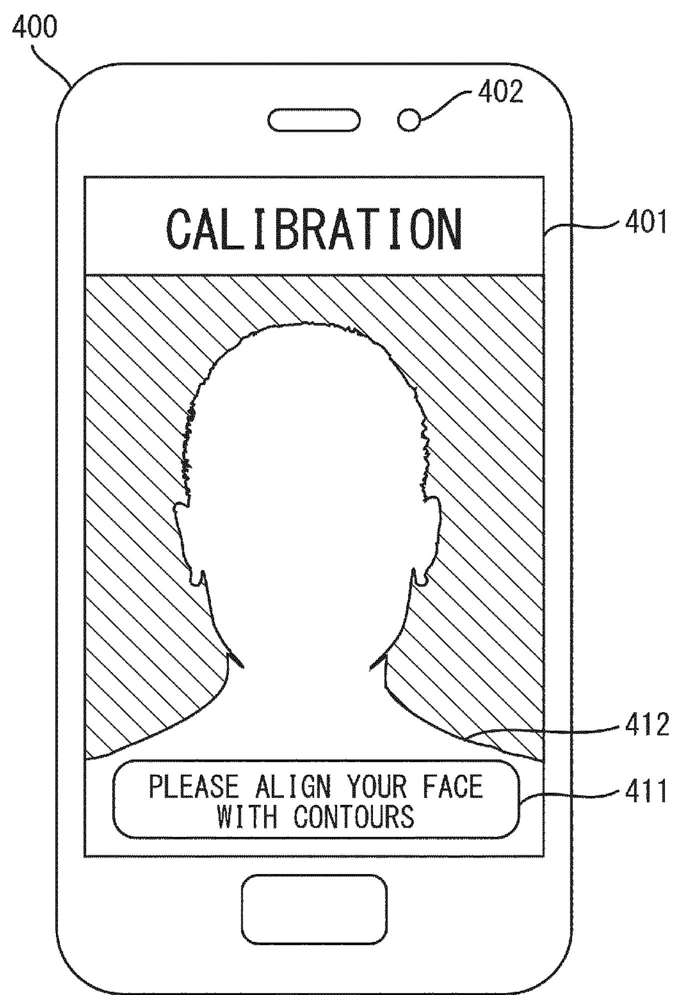
FIG. 4 is an example view of an illustrative screen for calibrating an electronic device to prevent sight deterioration in accordance with one embodiment of the invention.

FIG. 4 is an example view of an illustrative information displayed on a screen for calibrating an electronic device to prevent sight deterioration in accordance with one embodiment of the invention.

Device 400 can be an electronic device with a screen and a camera used as a distance sensor. Device 400 can be substantially similar to device 100 shown in FIG. 1 and device 210 shown in FIG. 2*a-c* and share the descriptions of components with any or all of the latter. For example, device 400 can include a distance sensor including one or more cameras 402 for capturing images of a user's head 290 (see, e.g., distance sensor 106 in FIG. 1 and distance sensor 215 in FIG. 2*a*, and 216 in FIG. 2*b*). Device 400 can include a screen 401 (see, e.g., screen 105 in FIG. 1 and screen 213 in FIG. 2*a-c*) and any other suitable electronic device components or any combination thereof.

Electronic device 400 can show a calibration menu on screen 401 as part of the device's calibration options. A calibration screen can include calibration aids 412. In the embodiment shown in FIG. 4, calibration aids 412 can include semi-transparent images of contours of a head. In some embodiments, calibration aids 412 shown on screen 401 can include concentric contours of a head, horizontal grids, vertical grids, geometrical shapes such as cross-hairs, other type of aids or any combination of any of the above. In the embodiment shown in FIG. 4, calibration aids 412 can include an instruction message 411 to a user.

Figure 5:
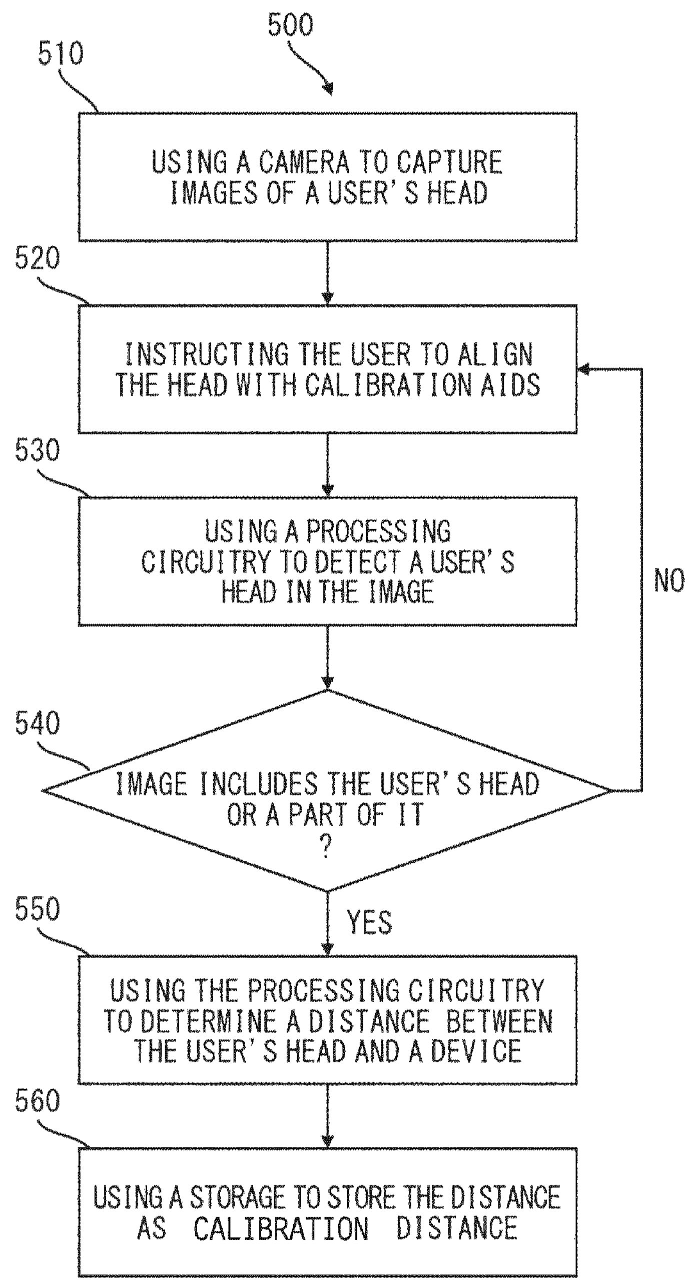
FIG. 5 is a flowchart of illustrative process for calibrating an electronic device to prevent sight deterioration in accordance with one embodiment of the invention.

As previously described, in some embodiments, a user can calibrate a system to prevent sight deterioration. For example, a user can be able to calibrate a relation between a physical distance from a user's head to a device and a number of pixels measured by the head along one or more axes in an image plane of a camera. FIG. 5 is a flowchart of illustrative process 500 for calibrating an electronic device to prevent sight deterioration in accordance with one embodiment of the invention.

Process 500 can be performed by an electronic device (e.g., device 100 in FIG. 1 or device 210 in FIG. 2*a,b*) with a screen (see, e.g., screen 105 in FIG. 1 and screen 213 in FIG. 2*a-c*) and a distance sensor including one or more cameras directed towards a user (see, e.g., distance sensor 106 in FIG. 1 and distance sensor 215 in FIG. 2*a* and 216 in FIG. 2*b*).

Process 500 can begin with block 510. At block 510, a camera can be used to capture images of a user's head. Any suitable camera can be used to capture images at block 510 using light diffused from a user's head. At block 520, a user can be instructed to maintain an electronic device at a certain calibration distance and to maintain an image of the user's head aligned with calibration aids (see e.g., calibration aids 412 in FIG. 4). For example, a user can be instructed at block 520 by an instruction message (see, e.g., instruction message 411 in FIG. 4) to maintain an electronic device directed towards the user at a calibration distance of half a meter. On the other hand, in some embodiments, a user can be instructed at block 520 of process 500 to maintain an electronic device at a calibration distance of the user's choosing.

At block 530, an image of a user's head or a part of it in an image of a camera can be detected. As previously described, any suitable technique or combination of techniques for processing output images (e.g., single pictures or video frames) of one or more cameras (see, e.g., distance sensor 106 in FIG. 1 and distance sensor 215 in FIG. 2*a* and 216 in FIG. 2*b*) can be used by processing circuitry (see, e.g., processing circuitry 107 in FIG. 1 and processing circuitry 214 in FIG. 2*a,b*) for detecting an image of a user's head or part of it. Block 540 can serve as a decision node in process 500. For example, if a user's head or part of it is detected in block 530, process 500 can proceed with block 550.

At block 550, a number of pixels measured by a user's head along an axis in an image plane of a camera can be stored (see, e.g., storage 102 in FIG. 1) as a result of calibration. As previously mentioned, in some embodiments a user can skip performing a calibration procedure, in which case a default values are used by processing circuitry for calibration distance and said number of pixels. More specifically, a default value of said number of pixels used by the processing circuitry can be calculated from a focal length of a lens of a camera (see, e.g., distance sensor 106 in FIG. 1 and distance sensor 215 in FIG. 2*a* and 216 in FIG. 2*b*), sensor size of the camera and average, estimated size of a human head. Returning to block 540, if a user's head or part of it is not detected, process 500 can return to block 520.

Figure 6A:
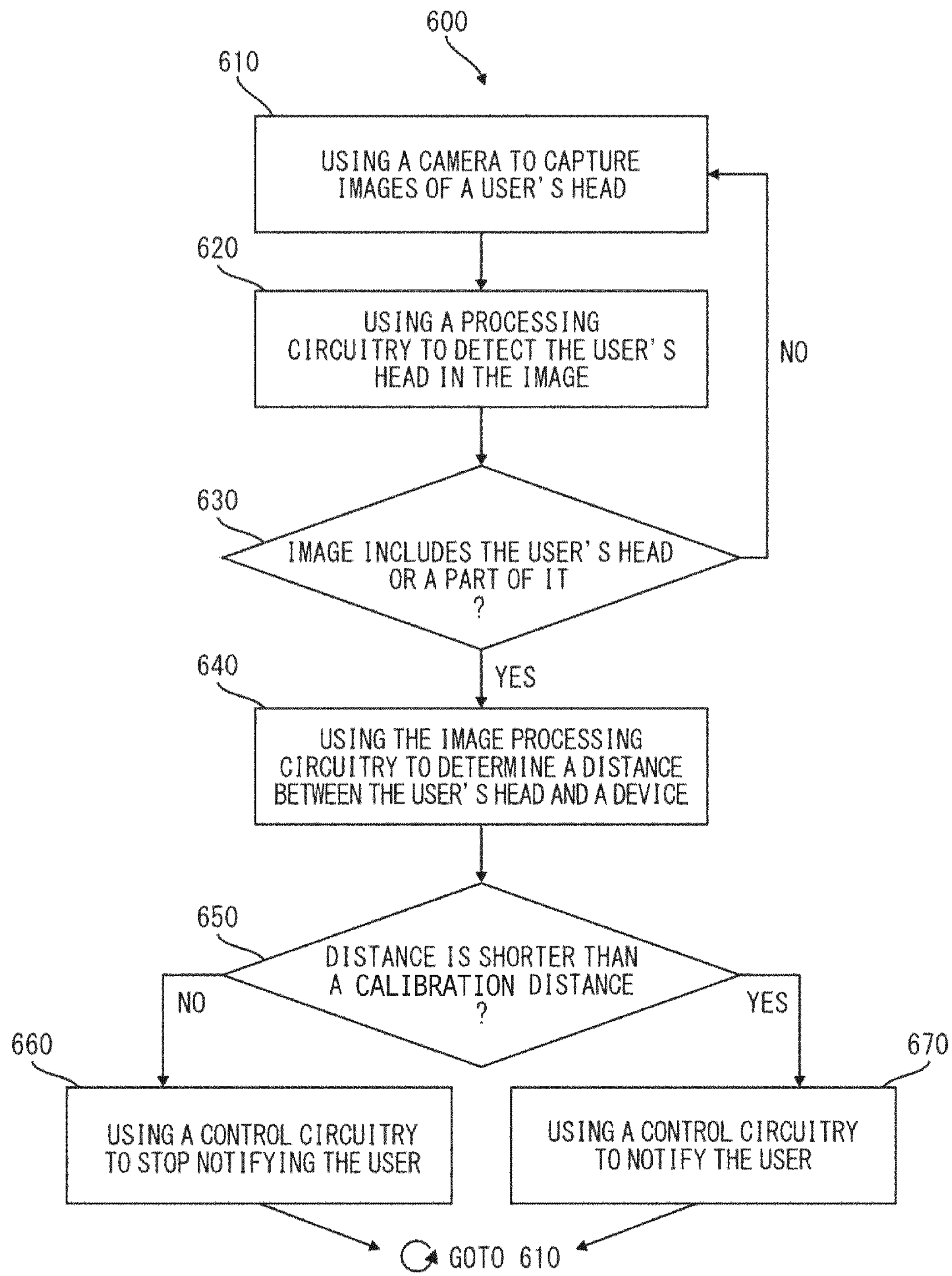
FIG. 6*a* is a flowchart of illustrative process for preventing sight deterioration in accordance with one embodiment of the invention, where a distance sensor includes one or more cameras.

As previously described, an electronic device can determine a distance between a user's head and an electronic screen using a distance sensor directed towards a user and notify the user if the distance is shorter than a calibration distance, putting the user at risk of sight deterioration and progression of myopia. FIG. 6*a* is a flowchart of illustrative process 600 for preventing sight deterioration in accordance with one embodiment of the invention. Process 600 can be performed by an electronic device (corresponding to device 100 in FIG. 1 or device 210 in FIG. 2*a,b*) with a screen (see, e.g., screen 105 in FIG. 1 and screen 213 in FIG. 2*a-c*) and a distance sensor including one or more cameras directed towards a user (see, e.g., distance sensor 106 in FIG. 1 and distance sensor 215 in FIG. 2*a* and 216 in FIG. 2*b*). In some embodiments, process 600 can be performed as a background process of a device in a continuous loop.

Process 600 can begin with block 610. At block 610, a camera can be used to capture images of a user's head. Any suitable camera can be used to capture images at block 610 using light diffused from a user's head. At block 620, an image of a user's head or a part of it in an image of a camera can be detected by processing circuitry (see, e.g., processing circuitry 107 in FIG. 1 and processing circuitry 214 in FIG. 2*a,b*). Block 630 can serve as a first decision node in process 600. For example, if a user's head is detected in block 620, process 600 can proceed with block 640. On the other hand, if a user's head or part of it is not detected, process 600 can return to block 610.

At block 640, a distance between a user's head and a device can be determined by processing circuitry. As previously described, any suitable technique or combination of techniques for processing output images (e.g., single pictures or video frames) of one or more cameras (see, e.g., distance sensor 106 in FIG. 1 and distance sensor 215 in FIG. 2*a* and 216 in FIG. 2*b*) can be used by processing circuitry for detecting whether they contain an image of a user's head, and for determining a distance between the user's head and a device. For example, a distance between a user's head and a device, "D", can be determined by processing circuitry using equation: $D=D_c \cdot R$, where: "$D_c$" is a calibration distance (see, e.g., block 520 of process 500), "R" is the ratio $n_p/n_{pc}$ between a number of pixels "$n_p$" in a user's head measured along an axis in an image plane at block 640, and "$n_{pc}$" is a similar number of pixels measured at block 550 of calibration process 500.

Block 650 can serve as a second decision node in process 600. For example, if distance D between a user's head and a device is shorter than a calibration distance $D_c$ (i.e. $D<D_c$, or $R<1$), processing circuitry can send a control signal to control circuitry (see, e.g., control circuitry 101 in FIG. 1 and control circuitry 211 in FIG. 2*a-c*), to notify a user at block 670. On the other hand, if a distance between a user's head and a device is equal or longer than a calibration distance (i.e. $D \geq D_c$, or $R \geq 1$), processing circuitry can send a control signal to control circuitry to stop notifying a user at block 660.

As described previously (see, e.g., block 520 of process 500), in some embodiments, a user can be instructed to maintain an electronic device at a calibration distance of the user's choosing during a calibration process 500. In this case, at block 650 of process 600, if a distance between a user's head and a device, is shorter than a calibration distance of the user's choosing (i.e. $R<1$), processing circuitry can send a control signal to control circuitry (see, e.g., control circuitry 101 in FIG. 1 and control circuitry 211 in FIG. 2*a-c*), to notify a user at block 670. On the other hand, if a distance between a user's head and a device is equal or longer than a calibration distance (i.e. $R \geq 1$), processing circuitry can send a control signal to control circuitry to stop notifying a user at block 660.

As mentioned before, process 600 can be performed as a background process of a device in a continuous loop. In such case, after ending with block 660 or block 670, process 600 can return to block 610.

As previously described, processing circuitry (see, e.g., processing circuitry 107 in FIG. 1 and processing circuitry 214 in FIG. 2*a,b*) of an electronic device can make use of additional capabilities of a camera, such as auto-focus or exposure control or others, or any combination of any of the above in order to improve performance of detection of a user's head in an image of a camera at block 530 of process 500 or block 620 of process 600. For example, any suitable processing circuitry can determine insufficient exposure of an image of a user's head and send a control signal to control circuitry (see, e.g., control circuitry 101 in FIG. 1 and control circuitry 211 in FIG. 2*a*-*c*) to increase exposure of a camera (see, e.g., distance sensor 106 in FIG. 1 and distance sensor 215 in FIG. 2*a* and 216 in FIG. 2*b*).

Figure 6B:
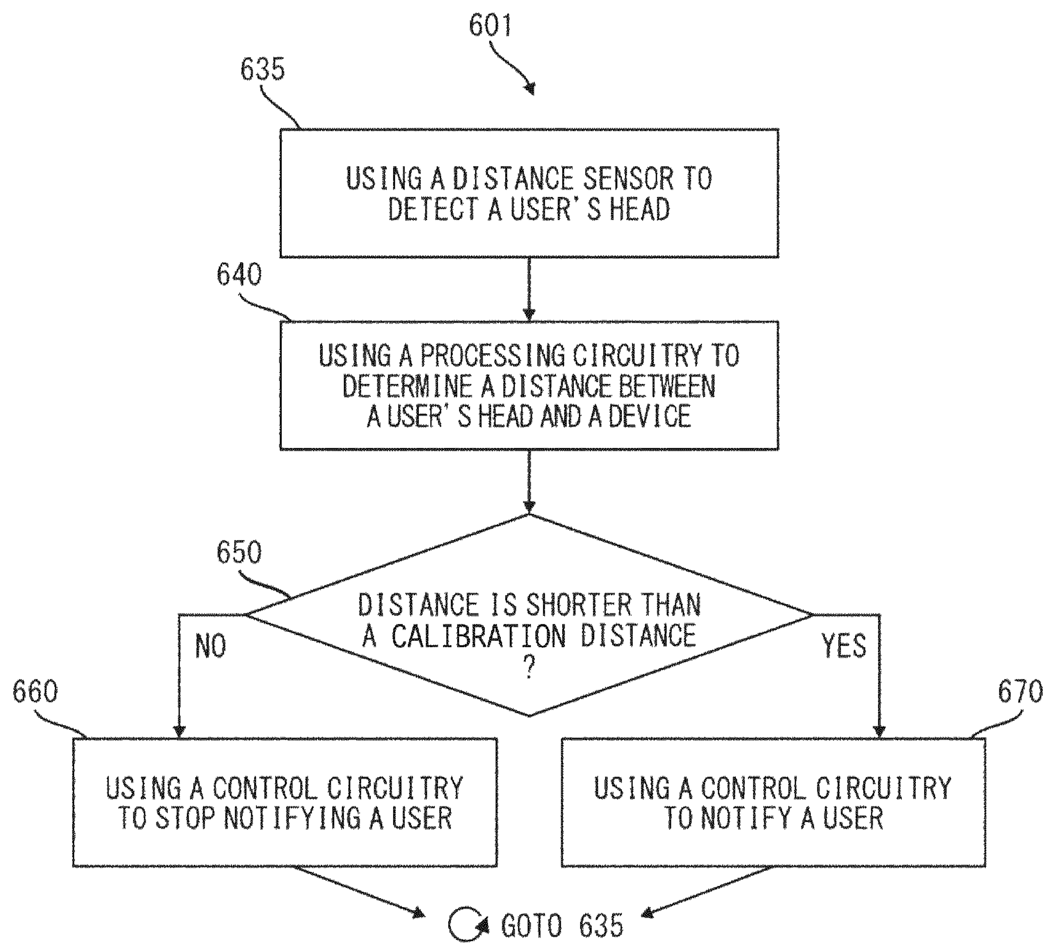
FIG. 6*b* is a flowchart of illustrative process for preventing sight deterioration in accordance with one embodiment of the invention, where a distance sensor includes a signal emitter and a sensor.

As previously described, an electronic device can determine a distance between a user and an electronic screen using a distance sensor directed towards a user and notify the user if the distance is shorter than a calibration distance, putting the user at risk of sight deterioration and development of myopia. FIG. 6*b* is a flowchart of illustrative process 601 for preventing sight deterioration in accordance with one embodiment of the invention. Process 601 is a variant of process 600 and shares descriptions of all its blocks common with process 600. Process 601 can be performed by an electronic device (corresponding to device 100 in FIG. 1 or device 210 in FIG. 2*a,b*) with a screen (see, e.g., screen 105 in FIG. 1 and screen 213 in FIG. 2*a*-*c*) and a distance sensor including a signal emitter and a sensor (see, e.g., distance sensor 106 in FIG. 1 and sensor 218 and emitter 219 in FIG. 2*c*) directed towards a user.

Process 601 can begin with block 635. At block 635, a distance sensor including a signal emitter and sensor can be used to detect a user's head. Any suitable distance sensor can be used to detect a head at block 635 using a signal emitted by an emitter, reflected from a user's head and detected by a sensor. At block 640, a distance between a user's head and a device is determined by processing circuitry (see, e.g., processing circuitry 107 in FIG. 1 and signal processing circuitry 220 in FIG. 2*c*). Block 650 can serve as a decision node in process 601. For example, if a distance between a user's head and a device is shorter than a calibration distance, processing circuitry can send a control signal to control circuitry (see, e.g., control circuitry 101 in FIG. 1 and control circuitry 211 in FIG. 2*a*-*c*) to notify a user in block 670. On the other hand, if a distance between a user's head and a device is longer than a calibration distance, processing circuitry can send a control signal to control circuitry (see, e.g., control circuitry 101 in FIG. 1 and control circuitry 211 in FIG. 2*a*-*c*) to stop notifying a user in block 660.

Furthermore, for the purpose of notifying a user at blocks 660 and 670 of process 600 and process 601, in some embodiments, control circuitry can modify operation of a device according to setting 312 (i.e. "effect type") in device 300.

The invention claimed is:

1. A computer-implemented method for preventing sight deterioration caused by an electronic screen of a device comprising:

detecting a distance between the head of a user and the electronic screen of the device, regardless of the location of the eyes of the user, based on a calibration distance and a ratio, wherein the calibration distance is previously defined by the user by placing the screen at a distance of user's choosing from the head;

performing a comparison between the calibration distance and the detected distance;

notifying the user of an inadequate distance to the screen according to the comparison, wherein the ratio is obtained from measuring a number of pixels in a user's head in an image and a number of pixels measured in an image at the calibration distance.

2. The computer-implemented method of claim 1, wherein the distance between the head of a use and the electronic screen is detected by a camera by:

capturing an image comprising the head of the user;

determining a number of pixels in the image corresponding to the head of the user and establishing a relationship between the number of pixels and the distance between the head of the user and the electronic screen.

3. The computer-implemented method of claim 1, wherein said notifying the user of an inadequate distance comprises:

blurring at least a part of the screen;

changing hue of at least a part of the screen;

changing saturation of at least a part of the screen;

changing brightness of at least a part of the screen;

displaying a message on the screen;

generating a sound in a speaker of the device;

generating a vibration in a vibration component of the device; or any combination thereof.

4. The computer-implemented method of claim 3, wherein said notifying the user of an inadequate distance is modulated based on a ratio between the detected distance and the calibration distance.

5. The computer-implemented method of claim 4, wherein the calibration distance is adjusted according to a parameter of a camera, wherein the parameter is one of the following:

focal length;

pixel size;

pixel pitch;

distance between image sensor and camera lens; or any combination thereof.

6. A non-transitory computer medium comprising computer-readable instructions stored thereon, that when executed by a processor of a device, cause the processor to carry out a method according to claim 1.

7. A system for preventing sight deterioration caused by an electronic screen of a device comprising:

a distance sensor is configured to detect a distance between a head of a user and the electronic screen of the device, regardless of the location of the eyes of the user, based on a calibration distance and a ratio, wherein the calibration distance is previously defined by the user by placing the screen at a distance of user's choosing from the head;

a control circuitry configured to control the distance sensor;

a processing circuitry configured to perform a comparison between the calibration distance and the detected distance, wherein the processing circuitry is further configured to cooperate with the control circuitry to notify the user of an inadequate distance to the screen according to the comparison, wherein the ratio is obtained from measuring a number of pixels in a user's head in an image and a number of pixels measured in an image at the calibration distance.

8. The system according to claim 7, wherein the distance sensor comprises:

an image sensor;

an inductive sensor;

a capacitive sensor;

a photoelectric sensor;

an optoelectronic sensor;

a magnetic sensor;

a sonic sensors; or any combination thereof.

9. The system according to claim 7, wherein the distance sensor is comprised in a camera controlled by the control circuitry to capture an image comprising at least a part of the head of the user and wherein the processing circuitry is configured to determine a number of pixels in the image corresponding to said part of the head and to establish a relationship with distance.

10. The system according to claim 9, wherein it further comprises an additional camera for stereoscopic distance determination.

11. The system according to claim 7, wherein the control circuitry is configured to modulate a notification of an inadequate distance the user based on a ratio between the detected distance and the calibration distance.

12. The system according to claim 7, wherein it further comprises:

a storage configured to store user information comprising the calibration distance and the detected distance; and a communication circuitry configured to transmit the stored information to a network.

13. A device comprising the system according to claim 7, wherein the device is one of the following:

a mobile phone;

a tablet;

a smart television;

a personal digital assistant;

a laptop computer;

a desktop computer;

a stand-alone camera;

a game console;

a video-recorder.

* * * * *